July 14, 1942.    J. P. SEAMONS ET AL    2,289,596
FLEXIBLE EXHAUST CONNECTION
Filed Sept. 17, 1940
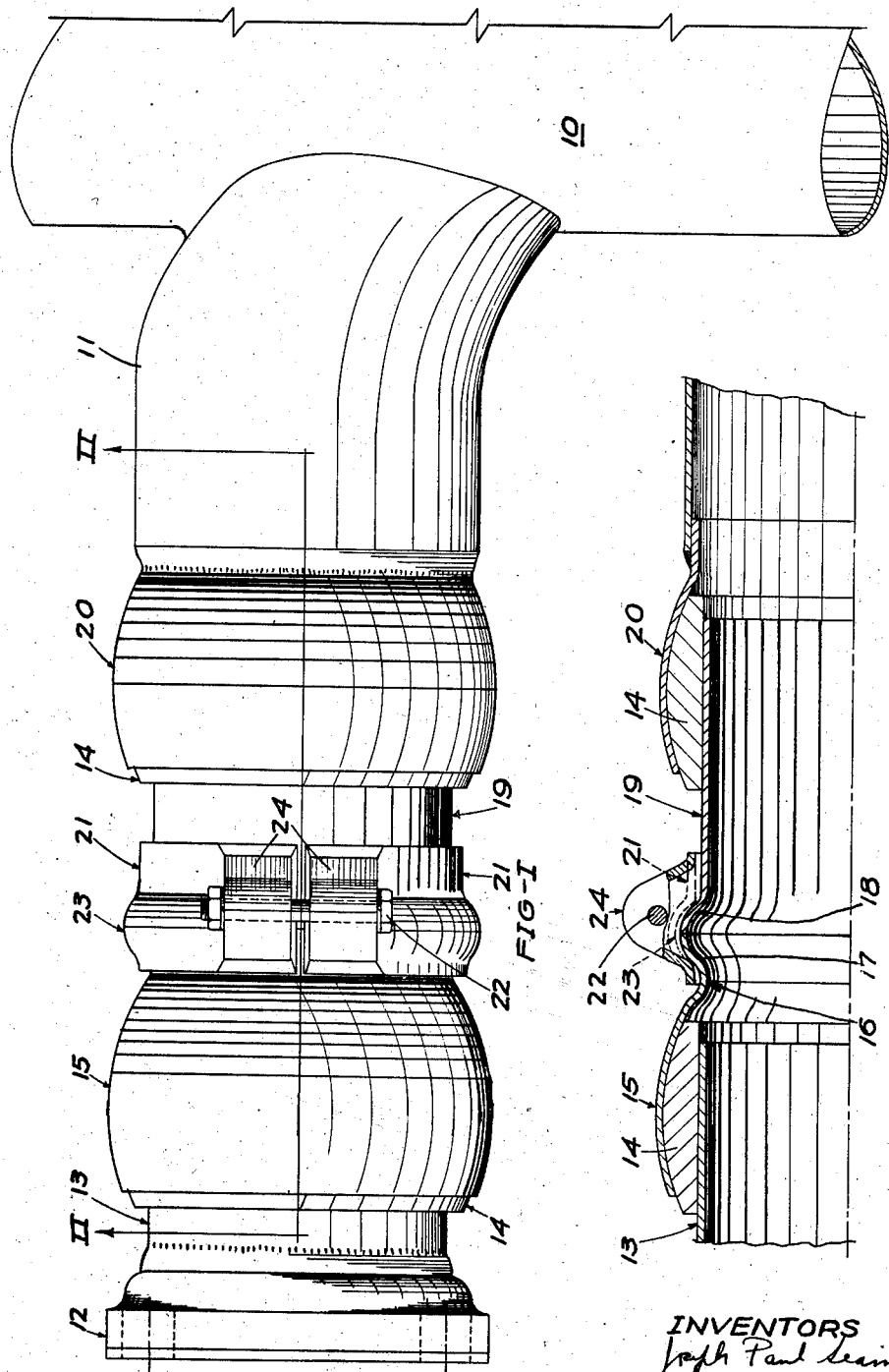
INVENTORS
Joseph Paul Seamons
Alonzo B. Storey Patented July 14, 1942

2,289,596

UNITED STATES PATENT OFFICE 2,289,596

FLEXIBLE EXHAUST CONNECTION

Joseph Paul Seamons, Hollywood, and Alonzo B. Storey, Jr., Glendale, Calif., assignors, by mesne assignments, to Vega Aircraft Corporation, a corporation of California Application September 17, 1940, Serial No. 357,142

1 Claim. (Cl. 285—11)

This invention relates to flexible exhaust connections between an internal combustion engine and the exhaust line or tail pipe, having special reference to the connection of individual airplane engine cylinders to a common exhaust collector ring or manifold, especially where the engine is yieldingly mounted relative to the airplane. With the continual increase in engine sizes, especially in the case of radially mounted cylinders, the exhaust manifold or collector ring has become an increasing problem necessitating the use of expansion joints therein to compensate for the expansion thereof at operating temperatures. The development of dynamic or flexible engine mountings which permit appreciable floating movement of the engine has added to the difficulties with the exhaust collector ring. A desirable solution of the problem is to rigidly mount the collector ring on the firewall of the engine nacelle and connect the individual cylinders to the ring by means of flexible joints which permit engine movements relative to the ring, providing for both angular movements and expansion or contraction.

It is accordingly an object of this invention to provide an improved flexible or universal joint that will operate satisfactorily at the high exhaust temperatures encountered, and that will permit both angular and axial movements within the joint, while maintaining a tight seal, making possible the accommodation of high exhaust pressures incidental to the use of exhaust turbine superchargers, and being readily demountable should it be desired to remove the engine or the individual cylinders thereof without disturbing other connections.

It is another object of this invention to provide an improved flexible or universal joint for the purpose described that can be disconnected to permit mounting of the engine without the need of simultaneously aligning the joints connected with the individual cylinders of the engine.

Other and further important objects of this invention will be apparent from the disclosures in the specification and the accompanying drawing.

This invention in its preferred form is illustrated in the drawing and hereinafter more fully described.

In the drawing:

Figure I is an elevation of a flexible joint embodying the features of this invention.

Figure II is a half section on the lines II—II of Figure I.

As shown:

A fragmentary half portion of an airplane exhaust collector ring 10 is indicated at the right of Figure I, which ring has individual inlets 11 for connection to each exhaust port of an engine (not shown), a suitable mounting flange 12, for attachment to the engine exhaust port, being shown at the left of the figure. The flange 12 supports a tubular sleeve 13 the outer end of which telescopically engages in a spherical segment or ball 14. The ball 14 is preferably made from a highly heat resistant grade of cast iron, as the operating temperatures at times approach a visible red heat. The ball 14 in turn is oscillatable in a spun housing 15, forming in effect a universal or ball joint. The housing 15 is necked down to form a circumferential channel 16 and is then spun outwardly in a half circle to form a half bead 17, another and complementary half bead 18 being formed on the end of a sleeve 19 which telescopically engages in a second ball 14 having a spun housing 20 welded to the individual collector ring inlet 11 previously mentioned.

The two half beads 17 and 18 have their abutting surfaces ground or otherwise finished to provide a gas tight joint without the use of a gasket, being held together by two semicircular clamps 21 secured by bolts 22, the clamps 21 being so formed as to have a less radius in the curved portions 23 thereof in order to engage the half joints remote from their matching surfaces. Bosses 24 for the bolts 22 may be struck from the material of the clamps or may be welded or otherwise secured thereto as may be desired; it being borne in mind that the illustrated form was designed specifically for aircraft use where extreme lightness, commensurate with adequate strength, is a desirable characteristic.

The novel ball joint of this invention provides for both lateral and longitudinal movements of the collector ring relative to the engine, the arrangement being such that longitudinal movement of the two ball joints is limited in one direction by the neck or channel 16, and in the other direction by the clamps 21, the intermediate parts of the joint floating between these limits. When it is desired to disconnect the joint, removal of the clamps 21 allows the half beads 17 and 18 to separate sufficiently to provide ample clearance between the surfaces of the beads. It will also be noted that the arrangement of the ball joints is such that the flow of exhaust gases from the engine to the collector ring sets up an injector effect at each ball joint which injector effect would tend to minimize outward leakage of exhaust gases in the event the extreme temperature variations in the joints developed looseness therein.

The balls 14 and housings 15 and 20 may be exact duplicates to eliminate separate manufacturing operations, since the half bead 17 may be added to the housing 15 after it has been spun in the form of the housing 20. Also the half bead 18 can be formed by the same tools used to form the bead 17, so that in effect the specialized spinning operations are duplicated in the several parts with an accompanying saving in tooling and manufacturing costs.

While we have disclosed and described this invention as particularly adapted to airplane engine exhaust connections, it will be understood that our invention is capable of a wide field of other uses, and our invention is not to be limited to the detailed disclosure but should be accorded the full scope and spirit of the following claim.

We claim as our invention:

A flexible exhaust conduit for connecting an exhaust pipe with an exhaust port of an internal combustion engine mounted for movement relative to said exhaust pipe during operation of said engine, said exhaust conduit comprising a conduit member connected to said exhaust port and having a sleeve portion extending therefrom, a ball member having a bore therethrough enveloping and fitting said sleeve portion, a joint section having a socket portion formed to envelop and fit the outer surface of said ball member and a sleeve portion, a second ball member having a bore therethrough enveloping and fitting said sleeve portion of said joint section, a second joint section having a socket portion formed to envelop and fit the outer surface of said second ball member and a sleeve portion connected to said exhaust pipe, at least one of said ball members being slidable axially of said conduit relative to the sleeve portion enveloped by said one ball member, and at least one of said joint sections having a separable butt joint therein between its sleeve portion and its socket portion.

JOSEPH PAUL SEAMONS.
ALONZO B. STOREY, Jr.